Aug. 1, 1967    R. M. VOITIK    3,333,856
LABYRINTH TYPE FACE SEAL
Filed April 22, 1964
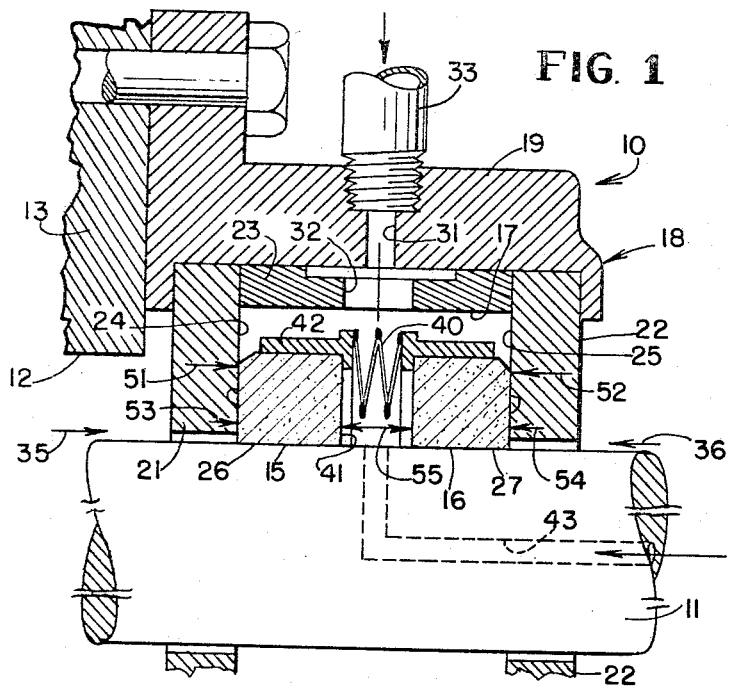
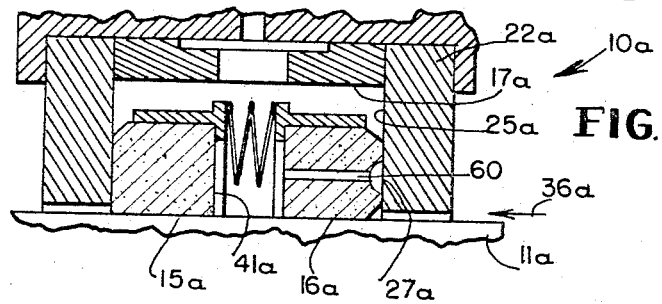
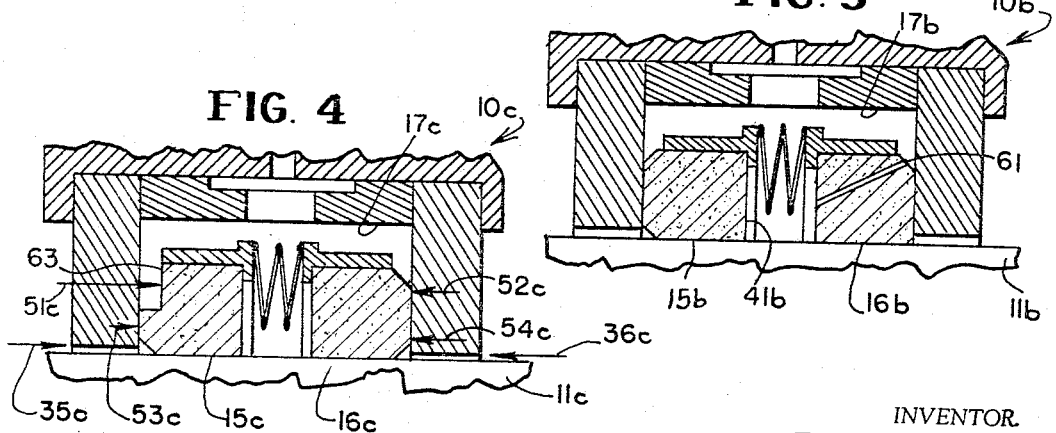
INVENTOR.
Robert M. Voitik
BY
Wofle, Hubbard, Voit & Osann
ATTYS.

United States Patent Office
3,333,856
Patented Aug. 1, 1967

3,333,856
LABYRINTH TYPE FACE SEAL
Robert M. Voitik, Glenview, Ill., assignor to Continental Illinois National Bank and Trust Company of Chicago
Filed Apr. 22, 1964, Ser. No. 361,716
7 Claims. (Cl. 277—59)

This invention relates to rotary seals and concerns more particularly labyrinth-type face seals.

In a labyrinth-type seal of the kind under consideration, the rotor is defined by a flat sided ring floatingly mounted on the shaft to be sealed and disposed within an inwardly opening annular chamber defined by the stator. Leakage through a seal of this kind primarily results from the gap between the rotor ring and the shaft which it surrounds. If this gap is closed down, the rotor tends to grab onto the shaft and be driven in contact with the stator wall. Since a conventional labyrinth seal has no provision for pressure balancing the face sealing contact between the stator and the rotor, grabbing of the rotor results in excessive wear and burning of the engaging axial faces.

This leakage problem is particularly acute in larger diameter labyrinth seals since larger shafts usually have greater runout, i.e., rotating eccentricity, and therefore a greater gap is required to prevent rotor grabbing.

Accordingly, it is the primary aim of the present invention to provide a labyrinth-type seal in which there is a pressure balanced face seal relationship between the rotor and the stator so as to minimize leakage around the rotor and permit the establishment of a minimum leakage path between the rotor and the shaft.

Another object of the invention is to provide a seal of the above character having few parts so as to be well suited for economical commercial manufacture.

A further object is to provide a seal of the above type suitable for his temperatures since no organic sealing components need be utilized.

Other objects and advantages of the invention will become apparent upon reading the following detailed description and upon reference to the drawings, in which:

FIGURE 1 is a fragmentary longitudinal section through a seal assembly embodying the present invention; and FIGS. 2, 3 and 4 are similar to FIG. 1 and show modifications of the invention.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning first to FIG. 1, there is shown a rotary seal 10 embodying the invention and arranged to effect a fluid seal preventing leakage along a rotatable shaft 11 through an opening 12 in a housing 13. The seal is basically a labyrinth-type seal and it includes a pair of rotor rings 15 and 16 floatingly mounted on the shaft 11 within an inwardly opening annular chamber 17 defined by a stator assembly 18. The stator assembly 18 includes an annular mounting member 19 mounted on the housing 13 and into which a pair of stator walls 21 and 22, separated by a spacer 23, are fitted and secured.

The walls 21, 22 are preferably formed of steel and are formed with highly finished axial sealing faces 24 and 25, respectively, opposing one another. The rotor rings 15, 16 are preferably formed of carbon and are formed with axial sealing faces 26 and 27, respectively, which are in flat abutting engagement with the stator faces 24, 25.

As is common in labyrinth seals, fluid under pressure is introduced into the chamber 17 and, for this purpose, alined openings 31 and 32 are formed respectively in the member 19 and the spacer 23. A conduit 33 connects the opening 31 to any convenient source of fluid under pressure, which conventionally is selected to be inert with respect to the sealed mediums at both sides of the seal 10 and which is supplied at a pressure slightly higher than the pressures at either side of the seal. In a typical example, air at 40 p.s.i. is supplied to the passage 31, and hence to the chamber 17, when oil at 17 p.s.i. acts in the direction of arrow 35 at the left of the seal 10 and air at 40 p.s.i. acts in the direction of the arrow 36 at the right of the seal.

In accordance with the invention, a closing member in the form of a bellows 40 is sealed between the adjacent peripheries of the rings 15, 16 so as to define an inner chamber 41, and a pressure is maintained in this inner chamber 41 that is a predetermined portion of the pressure in the chamber 17 surrounding the bellows. In this way, the rings 15, 16 can be closely fitted to the shaft 11 with a line-to-line fit or a few tenths clearance to insure slidability between the rings and the shaft, and the pressure differential across the bellows 40 will pressure balance the sealing engagement between the faces 24, 26 and 25, 27 so as to prevent burning and excessive wear when the rotors grab and rotate with the shaft. In the illustrated embodiment, the bellows is formed of metal rings welded at their alternate edges and bonded to ferrules 42 sealed around the outer periphery of the rings 15, 16. Preferably, the bellows 40 is slightly compressed so as to resiliently urge the ring faces 26, 27 against the stator faces 24, 25 and thus establish initial face sealing contact.

To maintain the desired pressure in the inner chamber 41, a passage 43 is formed in the shaft 11 which opens out into the inner chamber 41 so that the desired pressure can be supplied. The passage 43 can be conveniently coupled with the same source supplying the fluid to the opening 31 with there being a valve interposed to reduce the pressure. In the example discussed above, air at about 20 p.s.i. is supplied to the passage 43 so as to obtain approximataely a 1:2 pressure ratio between the inner chamber 41 and the stator chamber 17.

The operation of the seal 10 can now be understood. The pressurized fluids penetrate between the adjacent sealing faces 24, 26 and 25, 27 so that the highest pressure, that existing in the chamber 17, exerts the strongest force per unit area at the periphery of the rings 15, 16, as is indicated by the arrows 51 and 52. The oil exerts a smaller force indicated by the arrow 53 and the outer air exerts a slightly greater force indicated by the arrow 54. Instead of having the entire inner sides of the rotor rings 15, 16 subjected to the high stator chamber pressure, these rings are urged against the stator walls by the lower pressure existing in the inner chamber 41, as indicated by the double arrow 55.

The forces represented by the arrow 55 are, of course, greater than the opposing forces represented by the arrows 51, 53 or 52, 54 because of the greater surface area over which the pressure in the inner chamber 41 acts. However, the forces represented by the arrow 55 will be more nearly balanced by the opposing forces than would be the case if the pressure differential across the bellows 40 did not exist and, hence, the rotor rings 15, 16 are pressure balanced and rubbing engagement between the rotor and stator sealing faces can occur without burning or excessive wear.

Inherently, there is slight leakage between the faces 24, 26 and 25, 27 but, since the highest pressure exists in the chamber 17, this leakage is from the outer to inner peripheries of the rotor rings 15, 16 in the direction of the pressure drop. There is also some leakage out of the inner chamber 41 along the shaft 11 but again this leakage is outward in both directions. Hence, a good sealing effect with respect to the pressures represented by the arrows 35, 36 is obtained. If the magnitude of these pressures requires an increase in pressure supplied to the opening 31, a corresponding increase in pressure is established in the inner chamber 41 so as to maintain the pressure balance of the seal. Since the pressure balance controls the wearing engagement between the rotor and stator sealing faces, the clearance between the rotor rings and the shaft can be reduced to a point just permitting axial sliding movement between these parts so as to minimize leakage along the shaft.

The seal 10 is self-regulating in the sense that the parts tend to "wear in" and establish proper operating conditions. If the rings 15, 16 frictionally grip the walls 21, 22, the shaft 11, rotating relative to the rings, will wear the inner cylindrical surfaces of the rings with the result that greater leakage will occur from the chamber 41 along the shaft and through the rings. Increased leakage will drop the pressure in the chamber 41, the ring wear will further free the rings for axial movement, and both of these factors will tend to break the frictional grip between the rings and the walls 21, 22, thus causing the seal to operate properly with slippage between the rings and the walls with the rings being under good pressure balance.

Alternate ways of establishing the pressure differential across the bellows are shown in FIGS. 2 and 3 in which parts similar to those previously described have been given the same reference numerals with a distinguishing suffix *a* or *b* being added in the respective figures.

In seal 10a shown in FIG. 2, the rotor ring 16a is formed with one or more vents 60 connecting the inner chamber 41a with a point on the rotor ring sealing face 27a that is between the inner and outer periphery of the ring 16a. As explained above, a pressure drop exists across the adjacent faces 27a and 25a so that the vent 60 establishes an inner chamber pressure that is approximately equal to the average of the pressure in the stator chamber 17a and the pressure acting in the direction of the arrow 36a. The vent 60 automatically keeps the pressure in the inner chamber 41a at a predetermined proportion of the pressure introduced into the stator chamber 17a.

In the seal 10b shown in FIG. 3, the rotor ring 16b is formed with a thin bleed passage 61 which extends between the stator chamber 17b and the inner chamber 41b. As was explained above, fluid steadily leaks from the inner chamber 41b through the rings 15b, 16b along the shaft 11b and, in the seal 10b, this fluid is replaced through the bleed passage 61. The narrow bleed passage creates a pressure drop between the stator chamber 17b and the inner chamber 41b that is effective to maintain the desired pressure differential between these chambers.

Other than as described above, the seals 10a and 10b are identical to the seal 10 discussed in detail above.

For handling applications in which there is a large disparity between the pressures at the opposite sides of the seal, the embodiment shown in FIG. 4 is particularly useful. In this figure, parts corresponding to those previously described have been given the same reference numerals with the distinguishing suffix *c* added. Here, the pressure represented by the arrow 36c is significantly greater than the pressure represented by the arrow 35c and the higher pressure acting in the direction of the arrow 36c produces a proportionately greater force acting on the outer face of the rotor ring 16c, which force is represented by the arrow 54c. The seal 10c differs from those described above in that the face of the ring 15c which faces the lesser pressure at the left of the seal is cut away at its outer periphery to form an annular recess 63. This exposes a much greater area of the rotor 15c to the higher pressure within the chamber 17c so that the resulting force represented by the arrow 51c, together with the small force represented by the arrow 53c, more nearly balances the forces represented by the arrows 52c and 54c.

In addition to the obtaining of a labyrinth-type face seal in which the axial sealing surfaces are pressure balanced, those skilled in the art will appreciate that the seals described above are all relatively simple, straightforward designs so as to permit economical commercial manufacture. It will also be noted that no organic sealing elements are utilized and, hence the seals are well suited for high temperature applications.

I claim as my invention:

1. A labyrinth-type face seal comprising, in combination, a generally annular stator defining an inwardly opening annular chamber having opposed axial sealing faces, a pair of rotor rings disposed in said chamber and having axial faces abutting said stator faces, a bellows sealed between the adjacent peripheries of said ring, said bellows being slightly compressed so as to resiliently urge said ring faces against said stator faces, means for introducing fluid under pressure into said chamber and around said rings and bellows, and means for maintaining a fluid pressure between said rings and within said bellows that it is a predetermined portion of the pressure around said bellows.

2. The combination of claim 1 in which said last mentioned means comprises a bleed passage of restricted size between the regions within and without said bellows so as to establish a predetermined pressure drop across said passage.

3. The combination of claim 1 in which said last mentioned means comprises a vent formed through one of said rings from a point on the sealing face of the ring between the inner and outer periphery of the ring so that the pressure within said bellows approximately equals the pressure at said point.

4. In an assembly including a shaft passing through an opening in a housing, a rotary seal for said opening comprising, in combination, a stator sealed to said housing and defining an inwardly opening annular chamber surrounding said shaft, said chamber having opposed axial sealing faces, a pair of rotor rings closely but slidably fitted on said shaft and within said chamber, said rings having axial faces abutting said stator faces, flexible means connected to and forming a fluid seal between said rings so as to define an inner annular chamber between said rings, means for introducing fluid under pressure into said stator chamber and around said inner chamber, and means for maintaining a fluid pressure in said inner chamber that is a predetermined portion of the pressure around said inner chamber.

5. The combination of claim 4 in which said last named means includes a passage in said shaft opening out into said inner chamber.

6. In an assembly including a shaft passing through an opening in a housing, a rotary seal for sealing said opening when a lesser pressure exists on one side of the seal than on the other, the combination comprising, a stator sealed to said housing and defining an inwardly opening annular chamber surrounding said shaft, said chamber having opposed axial sealing faces, a pair of rotor rings closely but slidably fitted on said shaft and within said chamber, said rings having axial faces abutting said stator faces, said ring face that faces said side of lesser pressure being cut away at its outer periphery, a bellows sealed between the adjacent peripheries of said rings, and means for introducing fluid under pressure into said chamber and around said ring and bellows, said fluid under pressure acting on said cut away portion to counterbalance said uneven pressures.

7. A labyrinth type face seal comprising, in combination, a generally annular stator defining an inwardly opening annular chamber having opposed axial sealing faces, a pair of rotor rings disposed in said chamber and having axial faces abutting said stator faces, a sealing member disposed between the adjacent peripheries of said rings so as to define an inner annular chamber between said rings, means for resiliently urging said ring faces against said stator faces, means for introducing fluid under pressure into said chamber and around said rings and sealing member, and means for maintaining a fluid pressure between said rings and within said sealing member that is a predetermined portion of the pressure around said member.

References Cited

UNITED STATES PATENTS

| | | | |
|---|---|---|---|
| 2,971,783 | 2/1961 | Laser | 277—59 |
| 3,009,717 | 11/1961 | Laser | 277—62 |

FOREIGN PATENTS

| | | |
|---|---|---|
| 518,339 | 2/1940 | Great Britain. |
| 661,010 | 11/1951 | Great Britain. |
| 910,603 | 11/1962 | Great Britain. |

LAVERNE D. GEIGER, *Primary Examiner.*

D. MASSENBERG, *Assistant Examiner.*

UNITED STATES PATENT OFFICE
CERTIFICATE OF CORRECTION

Patent No. 3,333,856                                                August 1, 1967

Robert M. Voitik

It is hereby certified that error appears in the above numbered patent requiring correction and that the said Letters Patent should read as corrected below.

In the heading to the printed specification, line 4, after "Chicago" insert -- , Trustee --.

Signed and sealed this 25th day of June 1968.

(SEAL)
Attest:

Edward M. Fletcher, Jr.                                EDWARD J. BRENNER
Attesting Officer                                         Commissioner of Patents